United States Patent [19]

Chu et al.

[11] Patent Number: 4,956,435

[45] Date of Patent: Sep. 11, 1990

[54] NEUTRAL CURE SILICONE SEALANTS

[75] Inventors: Hsien-Kun Chu, Wethersfield Township, Hartford County, Conn.; Russell P. Kamis, Willard Township, County of Bay, Mich.; Jerome M. Klosowski, Monitor Township, County of Bay, Mich.; Loren D. Lower, Midland, Mich.

[73] Assignee: Dow Corning Corporation, Midland, Mich.

[21] Appl. No.: 327,209

[22] Filed: Mar. 22, 1989

[51] Int. Cl.$^5$ .............................................. C08G 77/06
[52] U.S. Cl. ........................................ 528/17; 528/34; 528/901; 524/860

[58] Field of Search ............................ 528/17, 34, 901; 524/860

[56] References Cited

U.S. PATENT DOCUMENTS

| | | | |
|---|---|---|---|
| 4,525,565 | 6/1985 | Laisney et al. | 528/34 |
| 4,652,624 | 3/1987 | Allen et al. | 528/17 |
| 4,772,675 | 9/1988 | Klosowski et al. | 528/15 |

*Primary Examiner*—Melvyn I. Marquis
*Attorney, Agent, or Firm*—Edward C. Elliott

[57] ABSTRACT

A faster curing neutral curing composition is obtained by the additive of an oxime compound to a composition comprising a trialkoxysilethylene endblocked polydiorganosiloxane, alkoxysilane crosslinker, and titanium catalyst.

10 Claims, No Drawings

NEUTRAL CURE SILICONE SEALANTS

BACKGROUND OF THE INVENTION

1. Field of the Invention

This invention relates to silicone sealants based upon trialkoxysilethylene endblocked polydiorganosiloxane cured with titanate catalyst.

2. Background Information

Silicone sealants based upon alkoxysilethylene endblocked polymers have been taught in U.S. Pat. No. 4,772,675, issued on Sept. 20, 1988. These polymers, when combined with alkoxysilane crosslinkers and titanium catalysts have improved shelf life over similar compositions prepared using the previously conventional alkoxy endblocked polydiorganosiloxane.

A sealant having improved shelf life and oil resistance is taught in U.S. Pat. No. 4,652,624, issued Mar. 24, 1987. This sealant makes use of the above described alkoxysilethylene endblocked polydioranosiloxane as one of the necessary ingredients.

SUMMARY OF THE INVENTION

The cure time of a sealant composition based upon an alkoxysilethylene endblocked polymer, alkoxysilane crosslinker, and titanium catalyst is improved by the addition of an oxime compound.

DESCRIPTION OF THE INVENTION

This invention relates to a neutral cure silicone composition comprising (A) 100 parts by weight of polymer of the formula

where each R is free of aliphatic unsaturation and is selected from the group consisting of monovalent hydrocarbon, monovalent halohydrocarbon, and monovalent cyanoalkyl radicals of 1 to 18 inclusive carbon atoms, each D is selected from the group consisting of vinyl radical and radical of the formula

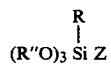

where each R" is methyl, ethyl, propyl, or butyl, R is as defined above, Z is a divalent hydrocarbon radical or combination of divalent hydrocarbon radicals and siloxane radicals, and x is of a value such that the polymer has a viscosity of from 0.5 to 3000 Pa.s at 25° C., the amount of vinyl radical of D being from 0 to 40 Percent of the total of endblocking radicals D, (B) from 0.1 to 14 parts by weight of a crosslinker of the formula

$R'_a Si(OR")_{4-a}$ where R' is methyl or Phenyl, R" is methyl. ethyl propyl, or butyl, and a is 0, 1, or 2, and (C) from 0.2 to 6.0 parts by weight of titanium catalyst, and (D) from 0.5 to 4 parts by weight of an oxime compound of the formula

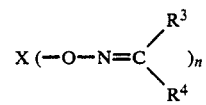

where X is chosen from the group consisting of hydrogen and $R^5 p^{si}$, $R^3$ is a hydrocarbon of from 1 to 18 carbon atoms, $R^4$ is a hydrocarbon of from 1 to 18 carbon atoms. $R^5$ is a hydrocarbon of from 1 to 18 carbon atoms, n is equal to the valence of X, and p is 1 or 2.

The method of this invention uses polymer of the formula

where each R is free of aliphatic unsaturation and is of the group monovalent hydrocarbon, monovalent halohydrocarbon, and monovalent cyanoalkyl radicals of 1 to 18 inclusive carbon atoms, each D is selected from the group consisting of the vinyl radical and radicals of the formula

$(R"O)_3 Si Z$ where each R" is at least one selected from the group consisting of methyl, ethyl, propyl, and butyl, Z is a divalent hydrocarbon radical or combination of divalent hydrocarbon radicals and siloxane radicals, and x is of a value such that the polymer has a viscosity of from 0.5 to 3000 Pa.s at 25° C., the amount of vinyl radical of D being from 0 to 40 percent of the total of endblocking radicals D. R can be any of those monovalent hydrocarbon, monovalent halohydrocarbon, or monovalent cyanoalkyl radicals of 1 to 18 inclusive carbon atoms which are known to be useful in silicone sealant materials. The preferred radicals are methyl, ethyl, propyl, phenyl, and trifluoropropyl. Z is a divalent hydrocarbon radical or combination of divalent hydrocarbon radicals and siloxane radicals. The divalent hydrocarbon radical can be from 2 to 15 carbon atoms in the form of a divalent alkylene or arylene radical such as ethylene, propylene, hexylene, phenylene, and

A preferred Z may be represented by the formula

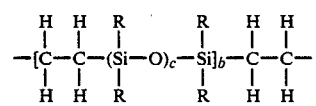

where R is as defined above, b is 0 or 1, and c is from 1 to 6.

The polymer of (A) can be produced by reacting a vinyl endblocked polydiorganosiloxane of the formula

$$\text{I}$$

where each R is as defined above, Vi is vinyl radical, and x is as defined above with as end capping composition of the formula

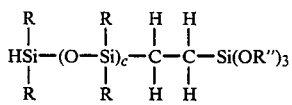

$$\text{II}$$

where R, and R" are as defined above, and c is 1 to 6. This endcapping composition can be produced by a method comprising (A) mixing 1 mole of a composition (a) of the formula

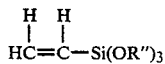

where R" is as defined above, with greater than 2 moles of a composition (b) of the formula

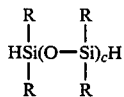

where R and c are as defined above, in the presence of a platinum catalyst and allowing to react, then, (B) optionally stripping the excess composition (b) from the product, to give an endcapping composition of the formula as given above. A preferred endcapping composition is that obtained when c is equal to 1 and b is equal to 1. The above endcapping composition, it's method of manufacture, and it's use in the manufacture of silicone sealants, having an alkoxy functional silane crosslinker and a titanium catalyst, is taught in U.S. Pat. No. 4,772,675, issued Sept. 20, 1988, which is hereby incorporated by reference to show the endcapping composition, it's manufacture, and it's use. The polymer produced from the above reaction of vinyl endblocked polydioranosiloxane (I) and endcapping composition (II) can be represented by the formula

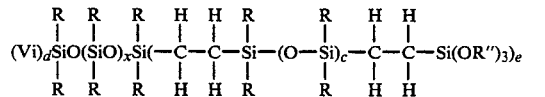

where each R, R", Vi, c, and x, are as defined above, and d and e are chosen so that d is on average from 0 to 40 percent of the total of d plus e.

The amount of the endcapping composition (II) used to react with the vinyl endblocked polydiorganosiloxane (I) is chosen so that the desired number of the vinyl endblocking groups are replaced with the alkoxysilethylene endblocking group from (II) on a molar basis. As an example, when the endcapping composition (II) is of the formula

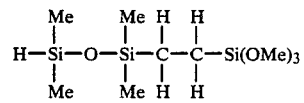

where Me is methyl radical and the vinyl endblocked polydiorganosiloxane (I) is a polydimethylsiloxane having a viscosity of about 55 Pa.s at 25° C. then the degree of endblocking versus the amount of endblocker used can be estimated from the following:

| Parts by Weight of Endblocker | Percent of Alkoxysilethylene Endblocks |
|---|---|
| 0.9 | 100 |
| 0.8 | 89 |
| 0.7 | 78 |
| 0.6 | 67 |
| 0.5 | 55 |

The above polymers can also be produced by using similar siloxanes and silanes in which the location of the hydrogen atom and the vinyl group which react together are reversed.

A crosslinker (B) of the formula $R'_a Si(OR'')_{4-a}$ where R' is at least one selected from the group consisting of methyl, ethyl, propyl, phenyl, and vinyl, R" is as defined above, and a is 0, 1, or Z, is added as a moisture scavenger and as a modulus control agent. These alkoxy silanes and their method of manufacture are well known. The amount of crosslinker preferably is from 0.1 to 14 parts by weight, with from 2 to 8 parts most preferred. It is possible to produce useful sealants without using a crosslinker when the polymer of this invention is present because of the functionality of the polymer itself, but from a practical viewpoint, the crosslinker is useful in that it contributes to the excellent shelf life of the sealant.

The sealants of this invention are cured through the use of a titanium catalyst (C). The titanium catalyst can be any of those known to be useful in catalyzing the moisture induced reaction of alkoxy containing siloxanes or silanes. Preferred are a titanium catalyst such as titanium naphthenate, titanium esters such as tetrabutyltitanate, tetra-2-ethylhexyltitanate, tetraphenyltitanate, triethanolaminetitanate, organosiloxytitanium compounds such as those described in U.S. Pat. No. 3,294,739, and beta-dicarbonyl titanium compounds such as those described in U.S. Pat. No. 3,334,067, both patents being herein incorporated by reference to show titanium catalyst and methods of manufacture. Preferred catalysts include tetrabutyltitanate, tetraisopropyltitanate, bis-(acetylacetonyl)diisopropyltitanate, and 2,5-di-isopropoxy-bis-ethylacetoacetate titanium. The amount of catalyst is from 0.2 to 6.0 parts by weight per 100 parts by weight of polymer (1). Preferred are from 0.5 to 3.0 parts by weight.

Useful silicone elastomeric sealants are commonly produced With a filler as one of the ingredients. These fillers are well known in the industry. They are added to the mixture to provide reinforcement of the polymer so as to control the physical properties of the sealant after curing. Reinforcing fillers, such as fumed silica, precipitated silica, and diatomacious earth, are used to give the highest physical strengths to the sealants. Reinforcing fillers are generally recognized as being very fine particles having a surface area from about 50 to 700 m²/g.

These fillers may be used with untreated filler surfaces or with treated filler surfaces, the treatment being used to modify the filler surface so that it properly reacts with the polymer and the other ingredients in the sealant. Calcium carbonate fillers are now available which are produced by precipitation which have a surface area of about 20 m²/g that give a reinforcing effect also. Extending fillers such as titanium dioxide, zirconium silicate, calcium carbonate, iron oxide, ground quartz, and carbon black may be used. The amounts of filler used can obviously be varied within wide limits in accordance with the intended use. For example, in some cases the sealant could be used with no filler, but it would have very low physical properties. Reinforcing fillers are commonly used in amounts from about 5 to 60 parts by weight to give the highest physical properties, such as tensile strength. Extending fillers are finely ground in that the average particle size is in the range of from about 1 to 10 micrometers. Extending fillers are used to modify the sealant properties and to provide opacity in some cases. Extending fillers are used in amounts as high as 200 parts by weight and more.

The improved cure rate obtained by the composition of this invention is due to the inclusion in the composition of from 0.5 to 4 parts by weight of an oxime compound of the formula

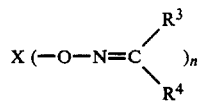

where X is chosen from the group consisting of hydrogen and $R^5 p^{si}$, $R^3$ is a hydrocarbon of from 1 to 18 carbon atoms, $R^4$ is a hydrocarbon of from 1 to 18 carbon atoms, $R^5$ is a hydrocarbon of from 1 to 18 carbon atoms, n is equal to the valence of X, and p is 1 or 2. $R^3$, $R^4$, and $R^5$ are chosen from radicals such as methyl, ethyl, propyl, phenyl, 3,3,3-trifluoropropyl, isopropyl, octadecyl, and benzyl. The preferred radicals are methyl and ethyl.

A preferred oxime is obtained when X is hydrogen and $R^3$ and $R^4$ are methyl or ethyl radicals. When methyl and ethyl are used as $R^3$ and $R^4$ respectively a preferred oxime is methylethylketoxime, a commercial product having the formula

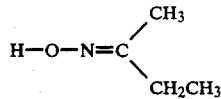

Another preferred oxime compound is methyltrioximosilane of the formula

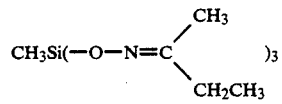

which is obtained through the reaction of methyltrichlorosilane with at least twice the stoichiometric amount of methylethylketoxime.

When p in the above formula for the oxime compound is equal to 2, $R^3$ is methyl radical, and $R^4$ is ethyl radical the oxime compound is of the formula

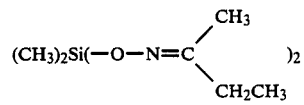

The oxime compound is added in an amount of from 0.5 to 4 parts by weight per 100 parts of polymer (A). The preferred amount of oxime compound is from 0.5 to 1 part per 100 parts of polymer (A).

The neutral cure silicone compositions of this invention have a faster cure than the comparable composition made without the presence of the oxime compound. The faster curing compound can be further combined with other ingredients, such as filler, to provide a faster curing sealant. This faster curing sealant is useful in all of the commonly recognized uses of such materials.

A preferred method of producing the composition of this invention mixes the polymer (A), with filler, if desired, deairing, and adding a deaired mixture of crosslinker (B), titanium catalyst (C) and oxime compound (D) which are added in the absence of exposure to moisture. The crosslinker (B). titanium catalyst (C) and oxime compound (D) can be added separately or they can be mixed together and added as a mixture. The ingredients are stirred to give a uniform mixture. The uniform mixture is then preferably deaired and sealed into storage containers, sealant tubes for example, to store it until it is to be used.

The following examples are included for illustrative purposes only and should not be construed as limiting the invention which is properly set forth in the appended claims. Parts are parts by weight.

EXAMPLE 1

A base composition was prepared by mixing 100 parts of a trimethoxysilethylene endblocked polydimethylsiloxane having a viscosity of about 50 Pa.s at 25° C. 30 parts of a trimethylsilyl endblocked polydimethylsiloxane having a viscosity of about 0.1 Pa.s at 25° C., and 175 parts of a calcium carbonate filler treated with stearate. The base was mixed and then deaired to remove air and moisture from the base.

The base (100 parts) was then mixed, in the absence of moisture, with 2 parts of methyltrimethoxysilane crosslinker and 0.52 parts of tetrabutyltitanate to give a composition (1) which cured in the presence of moisture. The composition was stored in a container in the absence of moisture. The cure rate was determined by measuring the tack free time (TFT) of the composition. The tack free time is defined as the time in minutes required for a curing material to form a non-tacky surface film. A sample is spread on a clean smooth surface and timing is begun. Periodically, a clean strip of polyethylene film is laid upon a fresh surface and a one ounce weight applied to it. After 4 seconds, the weight is removed and the strip gently pulled off. The time when the strip pulls cleanly away from the sample is recorded as the tack free time. The result is shown in Table I.

A composition (2) was prepared by repeating the above, except there was also added 0.52 Part of methylethylketoxime. This composition was tested for cure rate as above.

A composition (3) was prepared by mixing 100 parts of the above base with 2.3 parts of dimethyldimethoxysilane and 0.52 parts of tetrabutyltitanate. The composition was tested for TFT as above, with the result shown in Table I.

A composition (4) was prepared in the same manner as composition (3), except 0.52 part of methylethylketoxime was added. The composition was tested for cure rate as above.

TABLE I

| Composition | Ketoxime part | Tack Free Time minutes |
|---|---|---|
| 1* | 0.0 | 45 |
| 2 | 0.52 | 37 |
| 3* | 0.0 | 76 |
| 4 | 0.52 | 55 |

*comparative example

In each case, the addition of the methylethylketoxime increased the cure rate of the composition.

EXAMPLE 2

A comparative example was prepared which did not use the trialkoxysilethylene endblocked polydiorganosiloxane.

First, a sealant base (B) was prepared by mixing 100 parts of hydroxyl endblocked polydimethylsiloxane fluid having a viscosity of about 50 Pa.s at 25° C. and a hydroxyl content of about 0.057 weight percent, which fluid may contain a small amount of trimethylsilyl endblocks, 3.35 parts of hydroxyl endblocked polymethylphenylsiloxane having a viscosity of about 0.5 Pa.s at 25° C. and about 4.5 weight percent silicon-bonded hydroxyl radicals, 30 parts of trimethylsilyl endblocked polydimethylsiloxane fluid, 12.5 parts of fumed silica having a surface area of about 150 m2/g, and 177 parts of calcium stearate treated calcium carbonate filler having an average particle size of about 3 micrometers, until uniform.

Then 100 parts of the above base was placed in a sealant tube and 2 parts of methyltrimethoxysilane, 0.65 part of 2,5-di-isopropoxy-bis-ethylacetoacetate titanium, and 0.05 part of an adhesion additive were mixed in the absence of moisture. After thorough mixing for 10 minutes, the tube was centrifuged at high speed for 20 minutes to remove air, then was placed in a vacuum chamber at 25 inches of mercury for 3 hours to remove any volatile material. The resulting sample 5 was a comparative example The procedure of sample 5 was repeated, except 1 part of methylethylketoxime was also added, to give sample 6.

The procedure of sample 5 was repeated, except 0.5 part of tetrabutyltitanate was used as the catalyst, to give sample 7.

The procedure of sample 7 was repeated, except 1 part of methylethylketoxime was also added, to give sample 8.

The cure time of each sample was measured as above, with the results shown in Table II.

TABLE II

| Composition | Ketoxime part | Tack Free Time minutes |
|---|---|---|
| 5* | 0.0 | 56 |
| 6* | 1.0 | >80 |
| 7* | 0.0 | 120 |
| 8* | 1.0 | >120 |

*comparative example

These comparative examples show that adding the oxime compound to a composition which includes a hydroxyl endblocked polydiorganosiloxane rather than the required vinyl or trialkoxysilethylene endblocked polymer does not result in a faster cure.

EXAMPLE 3

A series of compositions were prepared in which the polymer used was endblocked with both vinyl groups and trimethoxysilethylene groups.

A polymer was prepared by reacting 100 parts of dimethylvinylsiloxy endblocked polydimethylsiloxane having a viscosity of about 55 Pa.s at 25° C. with 0.7 part of endcapper, the endcapper being tetramethyldisiloxane having a trimethoxysilethylene group on one end and a hydrogen atom on the other end. The reaction was run in the presence of 0.01 part of chloroplatinic acid complex of divinyltetramethyldisiloxane diluted with dimethylvinylsiloxy endblocked polydimethylsiloxane to provide 0.7 weight percent platinum as a catalyst. The reaction mixture was stirred for 2 hours, then allowed to age overnight. The finished polymer was endblocked on average with about 78 percent trimethylsilethylene and 22 percent vinyl. A sealant was then prepared by mixing 100 parts of the above polymer with 8 parts of fumed silica having a surface area of about 150 m2/g, 7 parts of methyltrimethoxysilane, and 2 parts of 2,5-di-isopropoxy-bis-ethylacetoacetate titanium, to give comparative sample 9.

Another sample (10) was prepared in a similar manner, but also contained 1 part of methyltrioximosilane (MTO). Each sample was measured for cure rate, with the results as shown in Table III.

TABLE III

| Composition | Ketoxime part | Tack Free Time minutes |
|---|---|---|
| 9* | 0.0 | 60 |
| 10 | 1.0 | 33 |

*comparative example

EXAMPLE 4

A composition was prepared in which the polymer was a mixture of the polymer of Example 3 and a hydroxyl endblocked polydimethylsiloxane.

A sealant was prepared by mixing 90 parts of the polymer of example 3, 10 parts of hydroxyl endblocked polydimethylsiloxane fluid having a viscosity of about 50 Pa.s at 25° C. and a hydroxyl content of about 0.057 weight, 8 parts of fumed silica having a surface area of about 150 m2/g, 8 parts of methyltrimethoxysilane, and 2 parts of 2,5-di-isopropoxy-bis-ethylacetoacetate titanium, to give comparative sample 11.

Another sample (12) was prepared in a similar manner, but also contained 1 part of methyltrioximosilane (MTO). Each sample was measured for cure rate, with the results as shown in Table IV.

TABLE IV

| Composition | Ketoxime part | Tack Free Time minutes |
|---|---|---|
| 11* | 0.0 | 44 |
| 12 | 1.0 | 30 |

*comparative example

EXAMPLE 5

A polymer was prepared as in Example 3, but the amount of endcapper used was 1.1 part rather than 0.7 part. This gave a polymer which was completely endblocked with trimethylsilethylene groups.

A sealant was then prepared by mixing 100 parts of the above polymer with 10 parts of fumed silica having a surface area of about 150 m2/g, 10 Parts of dimethyldimethoxysilane, and 1.6 parts of tetrabutyltitanate, to give comparative sample 13.

Another comparative sample (14) was prepared in a similar manner, but also contained 0.5 part of MTO. Comparative sample (15) was prepared in a similar manner, but contained 1.0 part of MTO Each sample was measured for cure rate, with the results as shown in Table V. The skin over time is defined as the time required for the material to cure to the point where it no longer adheres to a clean fingertip lightly applied to the surface. The cure conditions are 23° C. and 50 percent relative humidity.

TABLE V

| Composition | Ketoxime part | Skin Over Time minutes | Tack Free Time minutes | Slump inches |
|---|---|---|---|---|
| 13* | 0.0 | 12 | 24 | 1.13 |
| 14* | 0.5 | 6 | 30 | 0.13 |
| 15* | 1.0 | 8 | 32 | 0.05 |

*comparative example

The skin over time and the tack free time are much faster than the values as shown in Example 3 because of the use of dimethyldimethoxysilane as the crosslinker rather than methyltrimethoxysilane as in Example 3. The addition of the MTO did not further speed up the cure, probably due to the fact that the cure rate is now controlled by the diffusion rate of moisture into the composition. The amount of MTO Present does control the slump of the composition.

That which is claimed is:

1. A neutral cure silicone composition comprising
(A) 100 parts by weight of polymer of the formula

where each R is free of aliphatic unsaturation and is selected from the group consisting of monovalent hydrocarbon, monovalent halohydrocarbon, and monovalent cyanoalkyl radicals of 1 to 18 inclusive carbon atoms, each D is selected from the group consisting of vinyl radical and radical of the formula (R"O)$_3$ Si Z where each R" is methyl, ethyl, propyl, or butyl, Z is a divalent hydrocarbon radical or combination of divalent hydrocarbon radicals and siloxane radicals, and x is of a value such that the polymer has a viscosity of from 0.5 to 3000 Pa.s at 25° C., the amount of vinyl radical of D being from 0 to 40 percent of the total of endblocking radicals D,
(B) from 0.1 to 14 parts by weight of a crosslinker of the formula $R'_a Si(OR'')_{4-a}$ where R' is methyl or phenyl. R" is methyl, ethyl, propyl, or butyl, and a is 0, 1, or 2,
(C) from 0.2 to 6.0 parts by weight of titanium catalyst, and
(D) from 0.5 to 4 parts by weight of an oxime compound of the formula.

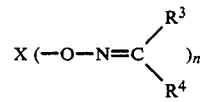

where X is chosen from the group consisting of hydrogen and $R^5_p$ Si, $R^3$ is a hydrocarbon of from 1 to 18 carbon atoms, $R^4$ is a hydrocarbon of from 1 to 18 carbon atoms, $R^5$ is a hydrocarbon of from 1 to 18 carbon atoms, n is equal to the valence of X and p is 1 or 2.

2. The composition of claim 1 wherein (A) is a polymer wherein D as from 70 to 100 percent trimethoxysilylethylene radical and from 0 to 30 percent vinyl radical.

3. The composition of claim 2 wherein (B) is a crosslinker wherein R is methyl and a is 1.

4. The composition of claim 3 wherein (C) is tetrabutyltitanate.

5. The composition of claim 3 wherein (C) is 2,5-diisopropoxy-bis-ethylacetoacetate titanium.

6. The composition of claim 3 wherein (D) is an oxime wherein X is hydrogen and $R^3$ and $R^4$ are methyl or ethyl radicals.

7. The composition of claim 3 wherein (D) is an oximosilane of the formula

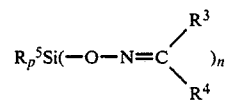

8. The composition of claim 7 wherein $R^3$, $R^4$, and $R^5$ are methyl or ethyl, p is 1, and n is 3.

9. The composition of claim 1 wherein there is also present a filler or fillers.

10. The composition of claim 8 wherein there is also present a filler or fillers.

* * * * *